(12) United States Patent
Fay et al.

(10) Patent No.: US 11,414,983 B2
(45) Date of Patent: Aug. 16, 2022

(54) DIGITAL THERMAL AVATAR

(71) Applicant: Schlumberger Technology Corporation, Sugar Land, TX (US)

(72) Inventors: James E. Fay, Katy, TX (US); Ke Li, Sugar Land, TX (US); Jane Kang, Sugar Land, TX (US)

(*) Notice: Subject to any disclaimer, the term of this patent is extended or adjusted under 35 U.S.C. 154(b) by 0 days.

(21) Appl. No.: 16/797,233

(22) Filed: Feb. 21, 2020

(65) Prior Publication Data

US 2020/0370419 A1 Nov. 26, 2020

Related U.S. Application Data

(63) Continuation-in-part of application No. 16/418,044, filed on May 21, 2019.

(51) Int. Cl.
*E21B 47/07* (2012.01)
*G01V 9/00* (2006.01)
*G01N 25/18* (2006.01)

(52) U.S. Cl.
CPC ............ *E21B 47/07* (2020.05); *G01N 25/18* (2013.01); *G01V 9/005* (2013.01)

(58) Field of Classification Search
CPC ......... E21B 47/07; G01V 9/005; G01N 25/18
See application file for complete search history.

(56) References Cited

U.S. PATENT DOCUMENTS

| 7,539,625 B2 | 5/2009 | Klumpen et al. |
| 10,318,916 B2 | 6/2019 | Altieri |
| 2017/0183963 A1* | 6/2017 | Al-Dosary ............ E21B 43/26 |

* cited by examiner

*Primary Examiner* — Tejal Gami (57) ABSTRACT

A digital avatar may be used to represent, track, and/or monitor behavior of a tool (e.g., a downhole tool) to track particular tools based on specific characteristics of the tool. For instance, a thermal digital avatar may be used to track or predict thermal generation for particular job durations or power levels based on physical characteristics of the tool. For example, the thermal digital avatar may be used to predict thermal generation based at least in part on a thermal efficiency that is based at least in part on the age of the tool, changes or imperfections in heatsinks, results of after-manufacture thermal testing, or a combination thereof.

19 Claims, 8 Drawing Sheets

DIGITAL THERMAL AVATAR

CROSS-REFERENCE RELATED APPLICATIONS

This application is a Continuation-In-Part Application of U.S. Non-provisional application Ser. No. 16/418,044 "System and Methods Using an Automated Model", filed on May 21, 2019, to which this application incorporates in its entirety for all reasons.

BACKGROUND

This disclosure relates to a digital representation of a downhole tool assembly. More particularly, this disclosure relates to the operational job planning for a field tool assembly that is subjected to high heat generation in a downhole environment.

In the oil and gas industry, certain field assets (such as key tool assemblies) that require high power in a downhole environment are used to perform various functions which are common for both Wireline and Logging While Drilling (LWD) and Measurement While Drilling (MWD) applications. The high-power operations are often accompanied by high temperature especially in the downhole environment. Tool assemblies used in high temperature environment may have reduced life expectancies due to heat generation during field operations if not monitored and managed properly. Thus, it is important to realize prompt and efficient field asset monitoring and management. Unfortunately, it may be difficult to use an actual power value (related to heat generation) from the actual field tool assembly serial number to estimate heat generated due to the changing conditions of the assembly (e.g., the aging effect). In fact, many field tool assemblies (such as mechanical and electronic assemblies) are not used to their full ability to complete higher temperature jobs or longer duration jobs in the field for operating locations that fit the current ability of the assembly to perform the job temperature profile since estimated heat generation may be inaccurate.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain examples commensurate in scope with the originally claimed subject matter are discussed below. These examples are not intended to limit the scope of the disclosure. Indeed, the present disclosure may encompass a variety of forms that may be similar to or different from the examples set forth below.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

In the oil and gas industry, the field asset management may use standard generic maintenance schedules that utilize large safety factors in operation parameters of field tool and equipment. This is done because of the difficulties in processing and tracking tool/equipment health data taken in the field and provided to an asset management system. Using the large safety factors, particular tools that are suitable for particular jobs may be prevented from performing the particular jobs due to the overly large safety factor for a particular tool. Another deficiency in traditional maintenance systems is that there are several disconnected databases and/or systems that are sometimes not actively synchronized with one another without the databases include universally linked automatic models configured individually to specify unique field assets such as a particular downhole tool assembly. An asset management system using automatic models that react automatically to input data from the field and provide tailored output data to the field database may enable more tailored safety factors.

The techniques presented herein are related to the use of a digital representation of a field asset that may be combined with data from changing conditions of the asset in field applications to enable dynamic and tailored modeling for the field asset. An asset management system incorporated with a customized automatic model specifically tied and tuned to the asset may enable a better understanding of asset condition, maintenance, and future operational conditions. For example, the asset management system may use automatic model(s) to commute an actual job profile for temperature duration and power generation before a job is started. This may allow the field crew to complete job planning depending on the ability of the tool assembly efficiency and total power that is used to complete the job. As a result, the tool may be operated at the correct logging or drilling speed to make sure it is not overheated but without burdensome safety factors.

Figure 1:
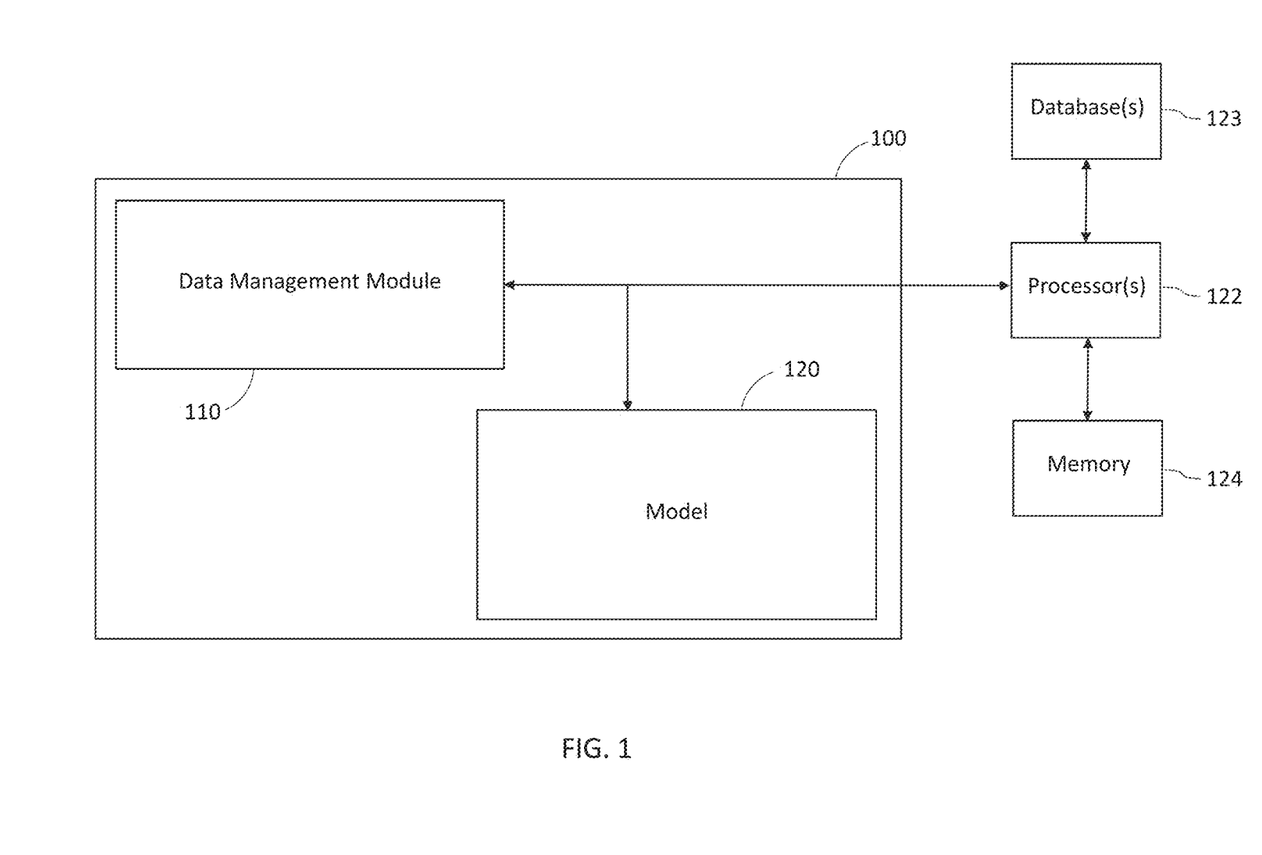
FIG. 1 depicts a block diagram of an example model management system, in accordance with an embodiment.

Turning now to the figures, FIG. 1 depicts a block diagram of a model management system 100. In this example embodiment, the model management system 100 includes a data management module 110 and one or more models 120. When more than one model 120 is used, at least some outputs from one model 120 may be input into a next model 120 of the models. The data management module 110 may include communication protocols and processing instructions. The data management module 110 may be in communication with one or more processors, as discussed below in relation to FIG. 5. The processors may be distributed processors, cloud-based processors, local processors, or combinations thereof. Any number of processors may be in communication with the data management module 110. For example, one processor, two processors, ten processors, twenty processors, or twenty processors may be in communication with the data management module 110. Hereinafter, the one or more processors in communication with data management module 110 will be referred to as a model management processor 122.

The communication protocols included in the data management module 110 allow the model management system 100 to talk with one or more databases 123. The protocols may include Open Database Connectivity (ODBC), TCP/IP Protocol, Distributed Relational Database Architecture (DRDA) protocol, Database Change Protocol (DCP), HTTP protocol, other suitable current or future protocols, or combinations thereof.

The model management processor 122 may execute instructions stored in memory 124. The instructions may instruct the model management processor 122 to retrieve information from one or more databases, using the protocols. And the processing instructions may also instruct the model management processor 122 to process the data and route appropriate data to one or more models 120 as an input.

The model management processor 122 may also be configured to receive outputs from the model 120. The model management processor 122 may provide data tagging to the outputs. The data tags may be used as identifications by one or more processors, which may include the data management processor, to store the data to an appropriate location in one or more databases.

The data management module 110 may include one or more processing instructions stored in a non-transitory, computer-readable medium, wherein the processing instructions, when executed by the model management processor 122, cause the model management processor 122 to detect when a new input is provided to a linked database. The instructions also cause the model management processor 122 to process and map the data from the database to the appropriate input for the model 120. The instructions also cause the model management processor 122 to automatically cause the model 120 to run the simulation after receipt of input from the database; and automatically processing the output from the model to configure the output to be mapped to an appropriate location in the database. In one or more embodiments, the model management processor 122 may be configured to send the data to the database and store the modeled data in the appropriate location. In another embodiment, the model management processor 122 may send the appropriately processed data to a connected system, and an additional processor may use data tags associated with the processed data to locate the appropriate database and input the data into the appropriate location.

The data management module 110 may detect new inputs entering into a linked database by receiving a signal sent by a processor in communication with the database indicating new data has been received, a signal sent by the model management processor 122 in communication with the database, or combinations thereof. In one or more embodiments, the signal may be sent by a user who inputs the data by clicking a save button on a user interface that sends a signal to the model management processor 122 or another processor in communication with the database.

The signal may also be sent automatically if a processor in communication with the database can detect that new data has been received. This processor, in communication with the database, may compare a historical database to an active database at a predetermined interval. For example, the comparison may occur every 1 millisecond, 100 milliseconds, 1 second, 10 seconds, 1 minute, 1 hour, etc. The predetermined interval may be any suitable interval of time. In other embodiments, one or more processors in communication with the database may be configured to compare a prior historical database (i.e., a copy of the database last updated at the end of the preceding interval) at a time lapse from the end of the last update (e.g., 10 seconds) to an active database. If the processor determines that there is now additional data in the active database, it may send a signal to the data management module 110, and the data management module 110 may then instruct the processor linked to the model management system 100 to retrieve the newly inputted data from the database.

In one or more embodiments, the data management processor may be instructed to take actions under computer instructions in the data management module 110. For instance, the data management processor may compare a historical database to an active database at a predetermined interval. For example, the comparison may occur every 1 millisecond, 100 milliseconds, 1 second, 10 seconds, 1 minute, 1 hour, etc. The predetermined interval can be any suitable interval of time. For example, the model management processor 122 may be configured to compare a prior historical database (i.e., a copy of the database last updated at the end of the preceding interval) at a time lapse from the end of the last update (e.g., 2 seconds) to an active database. If the model management processor 122 determines that there is now additional data in the active database, it may retrieve the new input from the database.

The newly inputted data may be received by the data management module 110. A set of processing instructions may instruct the model management processor 122 to process and map the data from the database to the appropriate input for the model 120. For example, the processing instructions may instruct the model management processor 122 to identify the data tag or tags associated with a specific field asset, or to identify a data tag or tags associated with a specific field data type (such as temperature-, pressure-, and geometry-measuring tools). Once the data is identified, the data management module 110 may provide the required data as an appropriate input to the model 120.

The model management processor 122 may be configured to provide at least a portion of the new input data to the model 120 and to run at least one simulation after receipt of new input from the database by using the algorithms of the model 120. In one or more embodiments, the calculations on the inputs may be performed to create a modified input. The model 120 may use the identified new data associated with the appropriate input and/or the modified input to generate an output. The output may be tied to a specific data type. The data management module 110 may then instruct the model management processor 122 to tag the data with appropriate identifiers that the database 123 can use to determine the appropriate location to store the output, and/or also associate the data with at least one input. For example, the output of the model 120 may be a maximum temperature for a field asset A100, and the model management processor 122 may tag the data accordingly so that it is placed in the appropriate location in the database. Furthermore, the model management processor 122 may identify a location for the maximum temperature of the asset A100 and store it in the open location, thereby updating the maximum temperature for the asset A100 to the new maximum temperature value, which may then be made available to an inventory management module, a job planning module, other linked module, or combinations thereof. In one or more embodiments, the method may include running one or more models multiple times and receiving a plurality of results. The plurality of results may be combined to provide a final input for one or more models.

Figure 2:
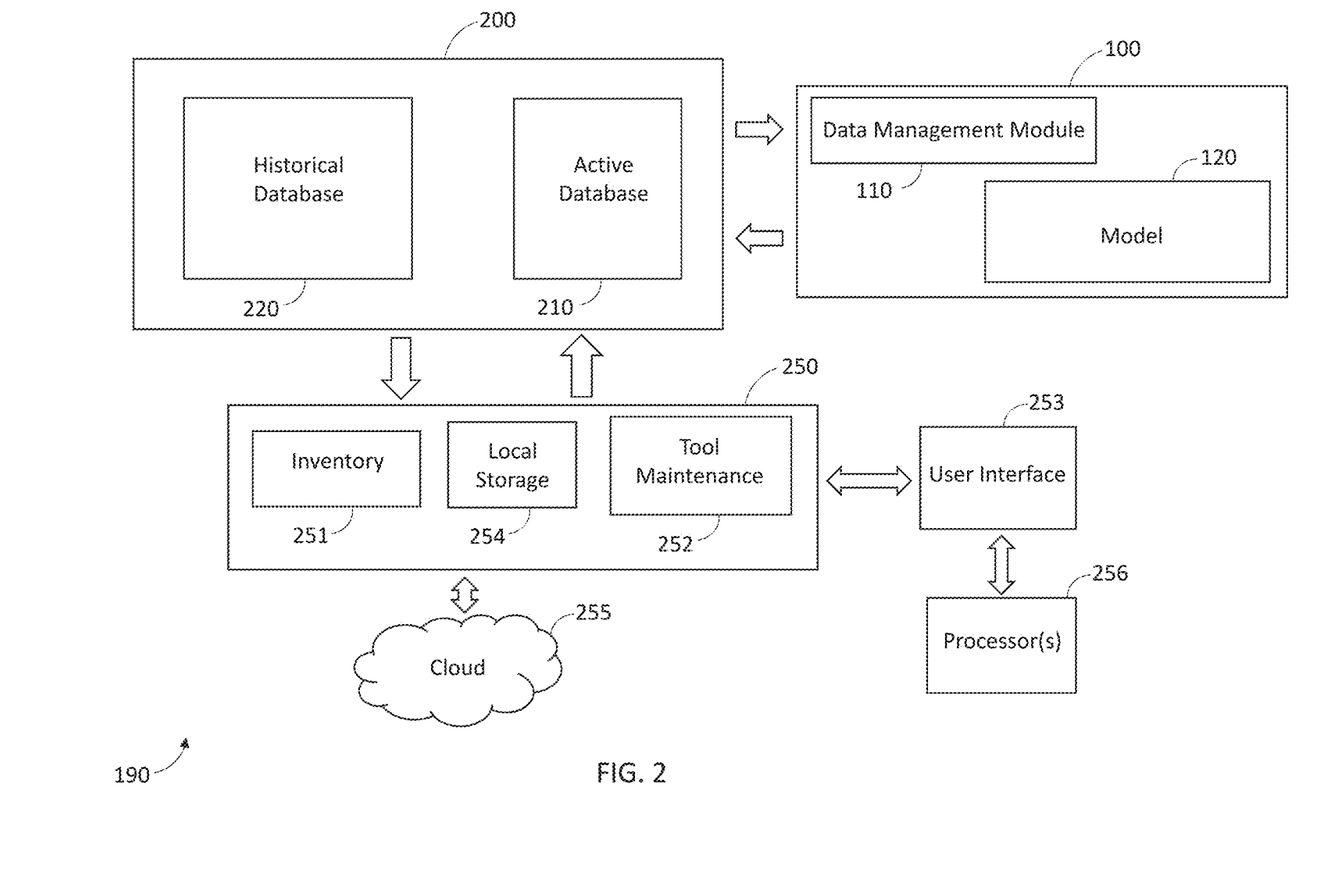
FIG. 2 depicts a block diagram of an example asset management system, in accordance with an embodiment.

FIG. 2 depicts a schematic diagram of an asset management system 190. The asset management system 190 may include an asset management module 250, a database module 200, and the model management system 100 described in previous sections.

The asset management module 250 may contain a local data storage 254 that stores data received from the database module 200 in a manner. The stored data in the local data storage 254 may be stored in a manner that may be easily searched and viewed by a user using a user interface 253. In one or more embodiments, the asset management module 250 may communicate with a cloud 255.

A processor 256 may be in communication with the asset management module 250 and the user interface 253. The asset management module 250 may include computer instructions and protocols to configure the processor 256 in communication with the asset management module 250. The instructions and/or protocols may be stored in the local data storage 254. The processor 256 may be configured by the computer instructions to query the database module 200 to obtain data matching the query and present to the user in a viewable manner on the user interface 253.

The processor 256 in communication with the asset management module 250 may search the data in the database module 200 based on input from a user through the user interface 253. For example, the input may be a maximum operating temperature, a maximum operating pressure, a type of tool needed, etc. For example, through the user interface 253, the user may query for a logging tool for a job that is to have a maximum operating temperature of 170 C. The configured processor 256 may conduct the search and present the result to the user on the user interface 253. In one or more embodiments, the data may be streamed to the local data storage 254 on assigned channels allowing the database module 200 to be associated with a specific channel that allows the data to be stored in the appropriate location in the database module 200. Furthermore, the data may have identification information that allows the data to be stored in the appropriate location in the database module 200. At least some of the input data may be entered manually using a text-based user interface into a storage associated with the specific type of data that allows the data to be stored in the appropriate location in the database module 200. And the processor 256 may be configured to check the assigned locations of the database to identify the data and present the result to the user.

In addition, the asset management module 250 may include an asset inventory module 251 and a tool maintenance module 252. The tool maintenance module 252 may include computer instructions and protocols (e.g., stored in the local data storage 254) to configure the processor 256 to stream new data to the database module 200 based on input from the user through the user interface 253. The new data may include the number of hours the tool was run on a job, power generation of the tool during a job, thermal efficiency of the tool, any maintenance activity performed on the tool, other changes to the tool, different operating characteristics of the tool, or other relevant information. The configured processor 256 may send the new data with appropriate tags to an active database 210 in the database module 200. And the new data may be stored in the appropriate location tied to the asset associated with the data, and the information inputted will be categorized appropriately based on data tags or other metadata.

As previously described, the data management module 110 may configure the model management processor 122 to receive new input data that is to be provided to the database module 200 and identify the asset associated with the new input data (e.g., using appropriate tags). The model management processor 122 may be further configured to provide at least a portion of the new input data to the model 120 as input data and to run the model 120 at least once to receive a new output based on the new input data.

In one or more embodiments, the model management processor 122 may be configured to automatically provide the new output to the database module 200 as an operation parameter for the associated asset. In one or more embodiments, the model management processor 122 may be configured to provide the output from a first model 120 to a second model 120 as an input, and then provide the output from the second model 120 as to the database module 200 as a new operating parameter.

The model management processor 122 or another processor may actively compare the active database 210 to a historical database 220 in the database module 200. The model management processor 122 may detect that new data is not in the historical database 220, retrieve the new input data, identify the required data for the model 120, and provide the appropriate data to the model 120 as inputs. The processor 122 may be configured to run the algorithms of the model 120 and obtain an output that may provide one or more new specifications of a field asset (e.g., maximum allowable operating temperature, maximum duration of a job, maximum allowable operating pressure, maximum allowable heat generation during a job, identified weak point in a tool, etc.).

The model management processor 122 may also be configured, by computer instructions in the data management module 110 and the protocols stored therein, to provide the new outputs to the active database 210, to use data tags and database structure to store the data in the appropriate location in the active database 210, and to update relevant specifications with the new output specifications.

A digital avatar may be built with the previously described infrastructures. The avatar is digital representation of a field asset or a process. As previously discussed, the field asset may be a physical object such as tool, device, equipment, etc. The digital avatar may comprise a dynamic model specifically linked to the field asset combined with operational data. It provides an abstraction layer for applications and users to access asset data, and therefore being able to monitor and control field assets and processes.

Furthermore, the digital avatar may be used as a building block for the Internet of Thing (IoT) implementations using such physical objects. The IoT is a system of interrelated computing devices, digital sensing devices, intelligent equipment, or any type of smart objects that are provided with unique identifiers and the ability to transfer data over a network without requiring human-to-human or human-to-computer interaction. IoT devices are increasingly becoming ubiquitous and accessible. With the greater flow of information and incorporated data processing and/or simulation capabilities, the IoT system provides users with the ability to track and monitor, lightened workloads with automation, and improved efficiency and better decision making. The IoT system may have four major components: sensors or devices, connectivity, data processing, and a user interface.

Figure 3:
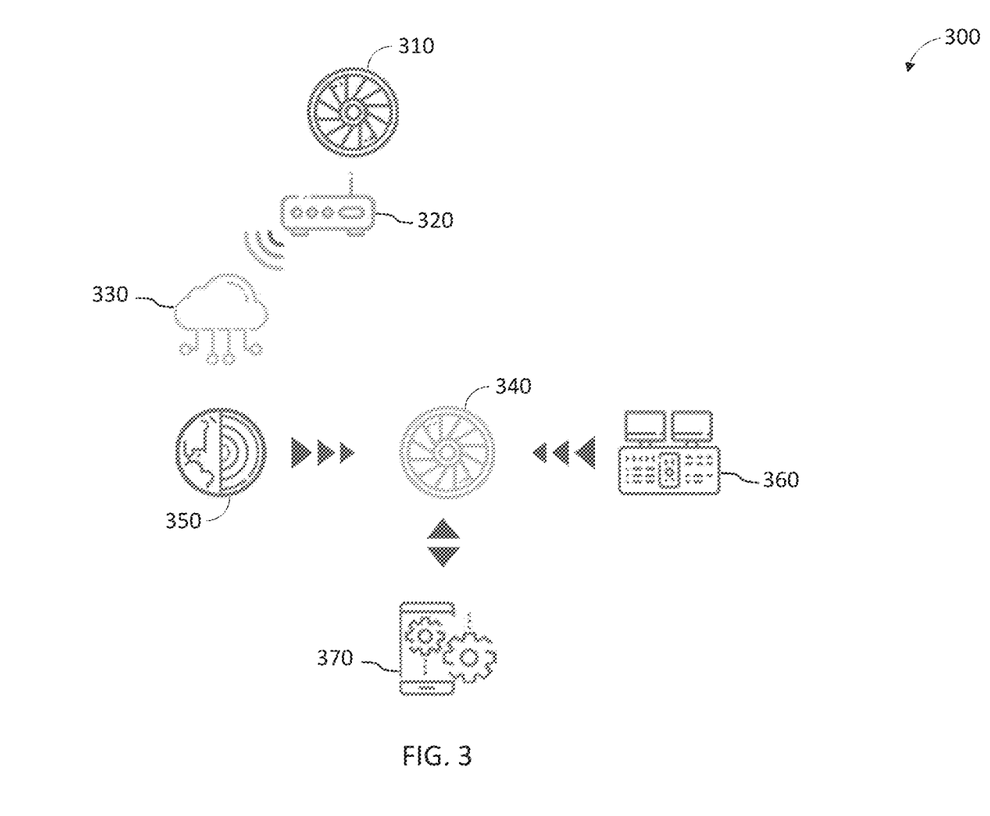
FIG. 3 depicts a block diagram of a digital avatar system that may be used in the asset management system of FIG. 2, in accordance with an embodiment.

With the preceding in mind, FIG. 3 depicts a schematic diagram of an example of digital avatar implementation system 300. For each item 310, a digital avatar 340 may be assigned to it, functioning as its digital representation. The digital avatar 340 may be implemented using any suitable processor (e.g., the processor 256) using instructions stored in memory. The item 310 may include a field asset or a process. The data acquired by the item 310 (e.g., acquired by the field asset or generated from the process) may be uploaded to a cloud 330 via an industrial internet of thing (IIoT) platform 320 that provides support for the item 310. The uploaded field data may be categorized, tagged, and stored into an IIoT database 350. In some embodiments, the field data may be pre-processed before storing to the IIoT database 350. The digital avatar 340 may access the field data stored in the IIoT database 350, use at least a portion of the data as input to feed into a model selected from a group of integrated system models 360, and run at least one simulation after receipt of new input from the IIoT database 350 by using the algorithms of the selected model to get the modeled output data. Such modeled data may be used for optimizing parameter(s) and/or operation(s) of the item 310. In addition, the digital avatar 340 may be communicatively linked to business applications 370 (such as operational systems). The digital avatar 340 may receive update data generated from the operational systems. For instance, an operational system may be a manufacturing management system so that the digital avatar 340 may access the initial information of the item 310 (e.g., material properties, defects, serial number, and the like existing at time of manufacture for the field asset). In one or more embodiments, as the item 310 is deployed, the digital avatar 340 may obtain access to additional information from an asset management system 190.

Figure 4:
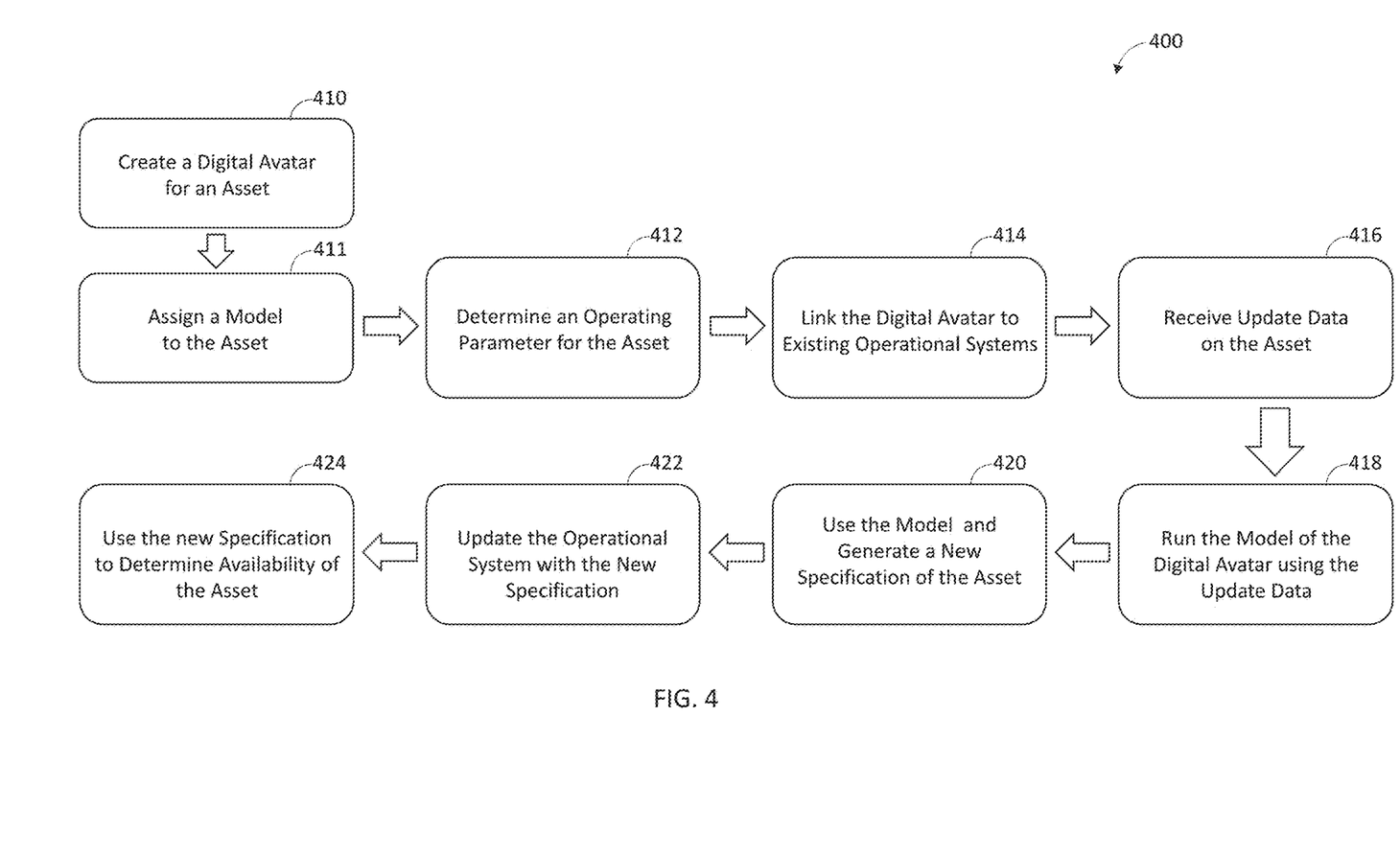
FIG. 4 shows a flow diagram that illustrates an asset management method that may be used by the asset management system of FIG. 2, in accordance with an embodiment.

FIG. 4 shows a flow diagram that illustrates asset management method 400. The asset management method 400 includes creating a digital avatar 340 for a field asset (block 410). The field asset may be similar to or equivalent to the previously discussed item 310. The digital avatar may be created during the manufacture of the asset or may be created before manufacture with later assignment. Creating the digital avatar may include customizing a digital avatar template to correspond to a unique asset. The customization may include using manufacturing information that includes unique geometry, an asset identification code, and measured material properties of the asset to customize an automatic model; thereby, forming a unique digital avatar for the asset.

Regardless of creation date, the digital avatar 340 assigns an automatic model to the item 310 (block 411). In one or more embodiments, the digital avatar may include a database that has the initial records of the associated asset and will be used to store all data entered on the asset during the lifecycle of the asset. The initial records may include material properties, geometry of the asset, important check points of the asset, initial temperature testing results from the manufacturing center, and the like at time of manufacture of the item 310. The digital avatar may also include an automatic model that is tailored to unique aspects of the item 310, e.g., the material properties, the geometry of the physical asset, the modes of failure, the temperature profile, the pressure profile, and the like. The automatic model may be configured to provide an output related to an operating threshold of the asset. For example, if the item 310 has a mode of failure of temperature overheating (over a given temperature operation of some electronics assemblies become inefficient) or melting, the automatic model may be used to predict at what temperature the item 310, with the specific material properties and specific geometry, will fail, and the maximum temperature until failure may be used as the maximum operating temperature. The digital avatar deployed in this example is a thermal digital avatar at elevated temperature as its model is tailored to the mechanical aspect of the asset at elevated temperature. However, similar techniques may be applied for other operating parameters of the item 310.

The asset management method 400 may also include determining an operating parameter for the asset (block 412). For example, the operating parameter may be determined from the model. The model may be fine-tuned by training and tuning the model to find the operating parameter at the calculated rating. Also, calculations outside of the model may be used to adjust the operating parameter. For example, calculations may be performed to determine the temperature rating for two failure modes (such as inhibited function or performance due to overheating and failure due to overheating). In addition, safety factors may be used to set an operating parameter rating, such as a temperature rating. Other operating parameter ratings may be heat generation, duration of a job (e.g., speeds of logging or depth of penetration), thermal conduction, heat dissipation, or other known or future known operating parameters.

The asset management method 400 may further include linking the digital avatar to operational systems (block 414). The operational systems may include manufacturing management systems, work order management systems, field asset management systems, job planning systems, a now known or future known business system that may be used to manage assets, manufacturing data, business data, the like, or combinations thereof.

The digital avatar may receive updated data generated from the operational systems (block 416). For example, the digital avatar may get initial information (e.g., material properties, defects, serial number, and the like) for the item 310 from the linked manufacturing management systems. Furthermore, as the item 310 is deployed, the avatar may get additional information from the asset management system 190, and as maintenance is performed on the item 310 or in the work order system.

The linking of the digital avatar to operational systems and automatic update of the asset digital avatar may be performed using at least one processor as new information on the associated asset is entered into the operational systems. For example, the new information may be acquired by automatically running the model with the new output, using the at least one processor in communication with the asset digital avatar and automatic model, to generate a new output; and automatically providing the new output to at least one of the operational systems, using the at least one processor.

The at least one processor may include multiple distributed processors, cloud-based processors, local processors, or combinations thereof. In one or more embodiments, different numbers of the processors may be configured to perform the asset management. For example, a first processor of the processors may automatically update the asset digital avatar as new information on the associated asset is entered into at least one of the operational systems; a second processor of the processors in communication with the asset digital avatar and automatic model may automatically run the model with the new information to generate a new output; and a third processor of the processors may automatically provide the new output to at least one of the operational systems.

The asset management method 400 may also include running the model of the digital avatar using at least a portion of the updated data (block 418). For example, the updated data may include seal replacement information, power generation, sub-assembly used in a tool, thermal efficiency, component switch out, or the like. The model may use only the portion of the updated data that is required, such as factors that relate to heat generation. In other situations, the model may require all updated data as input data or may require multiple types of updated data or combinations of updated data as input data, such as heat generation, thermal efficiency, and job profile of temperature.

Furthermore, the asset management method 400 may include using the model to generate a new specification of the asset (block 420), updating one or more operational systems with the new specification (block 422), and using the new specification to determine availability of the item 310 for a job with specific operating conditions (block 424).

Figure 5:
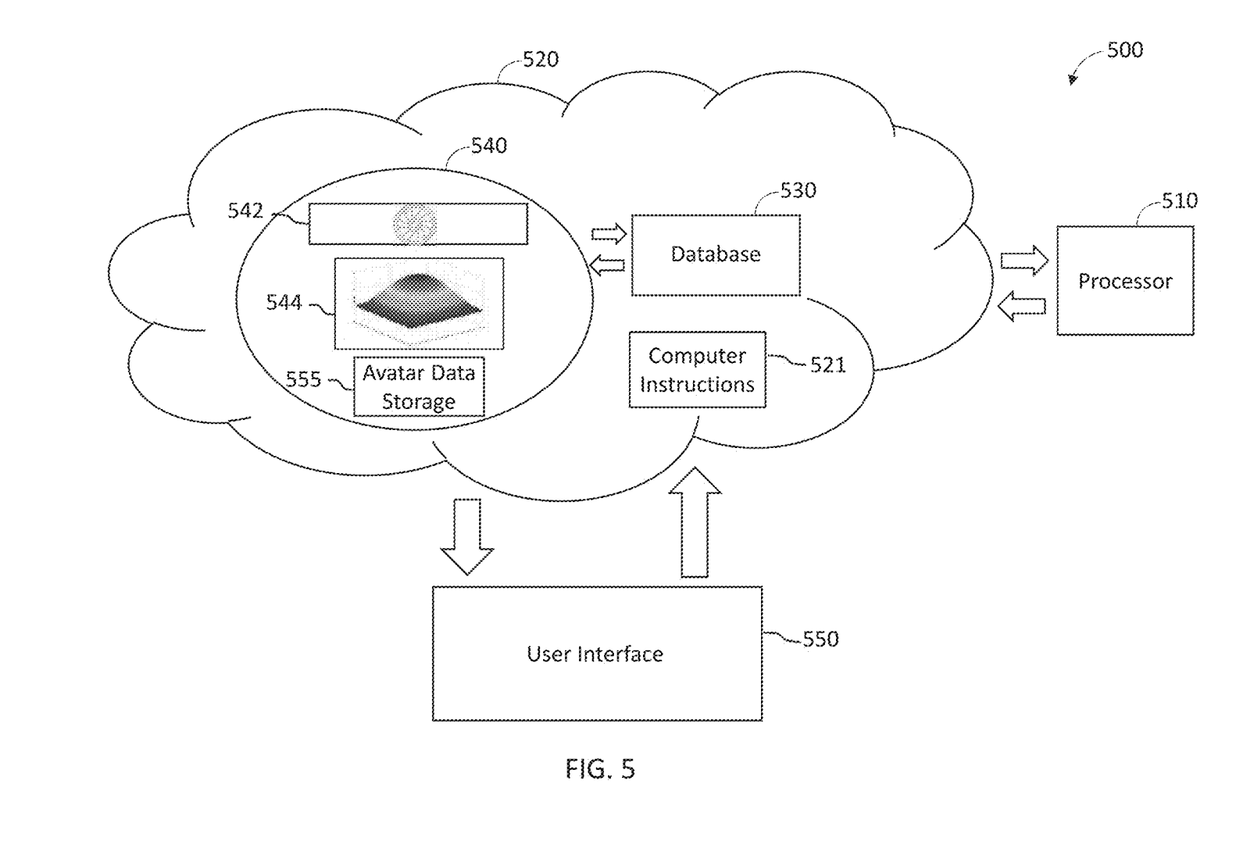
FIG. 5 depicts a schematic diagram of an example asset management system that includes a digital avatar of an asset tied to a model specific to the asset, in accordance with an embodiment.

FIG. 5 depicts a schematic diagram of an asset management system 500 that includes a digital avatar of a field asset tied to a specific model. This embodiment may be used in an asset management system 190 as described in FIG. 2, e.g., by placing the digital avatar 340 in the model management system 100.

The asset management system 500 may include one or more processors 510 in communication with and/or located within a cloud 520, one or more user interfaces, and/or devices 550 in communication with the cloud 520, one or more digital avatars 540 stored in the cloud 520, computer instructions 521 stored in the cloud 520, and one or more databases 530 located in the cloud 520. The digital avatar 540 may be similar to or equivalent to the previously discussed digital avatar 340.

The digital avatar 540 may include a digital image 542 of a field asset, one or more automatic models 544, and a digital avatar data storage unit 555. In practice, the avatar acts as a digital representation of a field asset. For example, a thermal digital avatar may represent at least the thermal aspects (such as operating temperature, mud type, formation type, heat generation, thermal efficiency of a tool housing, thermal paths of the housing or the system in general, etc.) of a downhole tool assembly.

The computer instructions 521 may be used to configure the processor 510. The processor 510 identifies when new data is inputted into the database 530. For example, when a user uploads data into the database 530, the processor 510 may be configured to detect the upload to the cloud and may be configured to place the input data into the database 530 and provide the input data to the appropriate avatar that is tied to an asset (e.g., item 310) associated with the input data. The processor 510 may be further configured to process the data using metadata, data tags, other identifiers, or combinations thereof to determine the asset associated with the input data and the type of parameters to which the input data applies. Accordingly, the asset management system 500 may be able to store the data in the appropriate location in the database 530 and provide correct inputs to the automatic model 544. The processor 510 may also be configured to execute the algorithms of the automatic model 544 and obtain an output. The asset management system 500 may store asset specific information in the digital avatar data storage unit 555 in the appropriate location thereby, updating the digital avatar 540. The output from the automatic model 544 may be placed into the database 530 as a new specification for the appropriate asset. The database 530 may then be used to update asset availability. For example, when a field person is to use a similar asset and queries the database 530, the processor 510 may provide the new operating parameters (e.g., maximum operating temperature, maximum duration of a job, maximum operating pressure, maximum heat generation during a job, etc.) and the new operating environment (including mud type, fluid density, velocity of a fluid, formation type, inclination of the well, and location of the tool in the well) for the asset and an indication of whether the asset can be used on the planned job based on the job parameters and the specifications of the asset.

In one or more embodiments, the asset management system 500 may include an asset digital avatar that is combined and/or communicatively linked with a second asset digital avatar. The automatic models of the asset digital avatars may use input data associated with the other assets to identify a system operation parameter. For example, new data associated with a first component asset may have a first digital avatar and at least one first automatic model. New data associated with an input of the at least one first automatic models may be provided to the at least one first automatic model. A new output from the at least one first automatic model may indicate one operating parameter, such as maximum heat generation or maximum operating temperature, for the first component asset. Similarly, a second component asset may have a second digital avatar and at least one second automatic model. New data associated with an input of the at least one second automatic model may be provided to the at least one second automatic model. A new output from the at least one second automatic model may indicate one operating parameter, such as maximum ambient temperature or maximum operating temperature, for the second component asset.

Next, one or more processors may be configured to compare the operating parameters for each component asset, when related to similar parameters (e.g., maximum operating temperature), and select the lowest or highest parameter as the system operating parameter for the assets including both the first component asset and the second component asset. For example, the first component asset may be more susceptible to heat impeding operation. The new operation parameter for the first component asset, which in this case may be the maximum operating temperature, is less than the new operation parameter for the second component asset. In such case, the processor would select the maximum operating temperature of the first component asset as the maximum operating temperature for the asset. In another embodiment, if the new operating parameter is permissible heat absorption, the processor may select the lowest permissible heat absorption as the operating parameter. In essence, the more-limiting parameter may be selected depending on which operating parameters of the digital avatars would most significantly limit the operational scope of the complete system.

In one or more embodiments, the asset management system may be configured using one or more operational systems to perform operational planning for a fleet of assets. For example, the system may continuously receive updated operating parameters for each asset and may compare the updated operating parameters to job requirements in multiple geographical locations and may adjust deployments of the assets to the geographical locations that will maximize each assets ability to be used in its geographical location. For example, a first location (e.g., North America) may have job specifications that only require tools with temperature ratings of a first temperature (e.g., 150° C.), and a second location (e.g., Asia) may have job specifications that require tools with no less than a second temperature (e.g., 260° C.). Accordingly, assets with new operating parameters below the first temperature will be shipped to the first location, and assets with new operating parameters above the first temperature but below the second temperature will be shipped to the second location.

Figure 6:
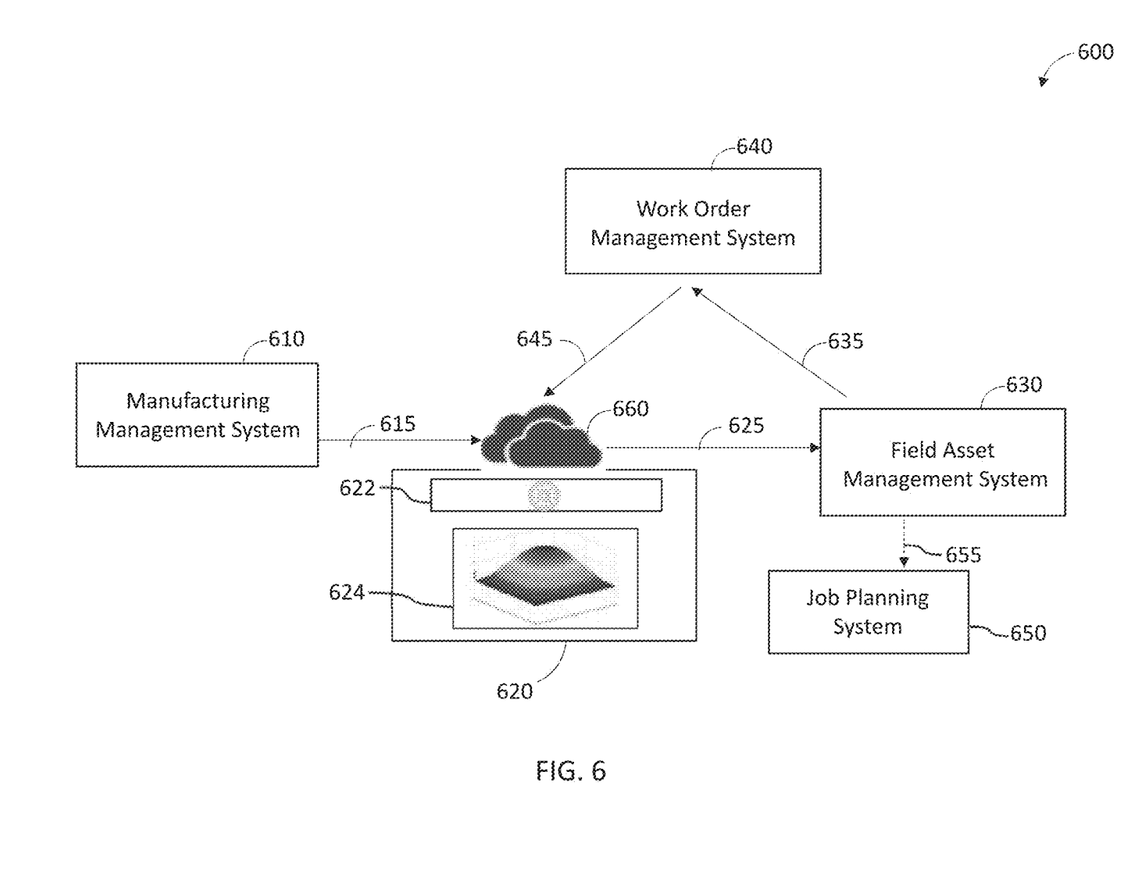
FIG. 6 illustrates a thermal digital avatar workflow for the asset management system of FIG. 5, in accordance with an embodiment.

FIG. 6 illustrates a thermal digital avatar workflow 600 for the asset management system 500. The thermal digital avatar workflow 600 utilizes a manufacturing management system 610, a field asset management system 630, a job planning system 650, and a work order management system 640. The management systems may be linked to a thermal digital avatar 620 through a cloud 660. Depending on the field application requirements, more systems and/or different combinations of systems may be used as well. For example, in certain embodiments, the asset management system may include a maintenance management system associated with one or more specific assets.

The manufacturing management system 610 may be used to acquire manufacturing data during the creation of a field asset, and the acquired manufacturing attributes 615 may be stored in a database of the thermal digital avatar 620 to which the asset the avatar is tied. As previously discussed, the thermal digital avatar 620 may be created for the asset during the manufacturing stage or using a preconfigured template corresponding to the asset. The thermal digital avatar 620 includes an automatic model 624 for the asset and may include a digital image 622 of the asset. For example, the thermal digital avatar 620 may be selected from choices of thermal avatars, which may be stored in the cloud 660.

The thermal digital avatar 620 may be modified with information from the inspection and testing before, during, or after manufacture of the asset. Additionally, or alternatively, the manufacturing attributes 615 may be supplemented by user inputs using a graphical user interface (GUI) in communication with the thermal digital avatar 620. After the manufacturing attributes 615 and additional inputs from the GUI are provided to the thermal digital avatar 620, the thermal digital avatar 620 is a customized specific digital avatar. The automatic model 624 may be configured to link to the asset by assigning the created thermal digital avatar 620 the same identification number as the field asset.

The thermal digital avatar 620 may be in communication with a processor (e.g., the processor 510), and the processor is configured to store the thermal digital avatar 620 in the cloud 660. The processor is also configured to provide updated information from the field asset management system, the maintenance management system, or both, after information associated with the asset is entered into at least one of the field asset management system or the maintenance management system. The processor may also be configured to run the automatic model 620 with the new information and provides a new operating parameter for usage by at least the field asset management system. In one or more embodiments, the field asset may be a downhole tool (e.g., a borehole sensing device). The processor may be configured to receive and store an initial thermal profile (e.g., the temperature variation with time) in a thermal digital avatar for the downhole tool; receive an update to a physical characteristic of a thermal profile for the downhole tool that effect the thermal profile for the downhole tool; update the thermal profile for the downhole tool based on the update to the physical characteristic; and assign the downhole tool to a job based at least in part on updated thermal profile. The physical characteristic described herein may be an imperfection in the heatsink of the downhole tool, an age of the downhole tool, results of a heat generation test, operating temperature of the downhole tool, thermal efficiency of a flask tool pressure housing, heat generation for a pulsed neutron generator, or a combination thereof.

In one or more embodiments, the automatic model 624 described herein may be any model. For example, the model may be a reduced order model, a Finite Element Analysis (FEA) model, a Computational Fluid Dynamics (CFD) model, a statistical model, a neural network model, one or more surrogate models, now known or future known analytic models, or combinations thereof.

In one or more embodiments, the asset management system may include instructions configured to cause a processor to check for new data in one or more databases rather than monitoring inputs directly. The asset management system may also include instructions to cause the processor to initiate a model sequence. The model sequence may include running a single model at least once or running a series of linked models (e.g., in parallel) at least once. In one or more embodiments, outputs from linked models may be an input to another linked model as part of the model sequence. In one or more embodiments, one or more reduced order models may run at least once as a standalone model or as a linked model.

Once the automatic model 624 is properly tuned and customized, the thermal digital avatar 620 may use the automatic model 624, the manufacturing attributes 615, and user inputs to calculate one or more operating parameters (e.g., the temperature ratings) for the asset. The calculated parameters (e.g., temperature ratings) may then be sent to the field asset management system 630, which may use the parameters (e.g., temperature ratings) to identify if the asset is available and suitable for a scheduled job based on inputs to the job planning system 650. The field asset management system 630 may indicate available assets 655 to the job planning system 650, which then assigns assets that can be used under the required operating conditions.

To keep the information in the thermal digital avatar 620 current, the identified asset may be sent for scheduled inspection and maintenance based on a predetermined schedule or as needed. The field asset management system 630 may also send a work order 635 to the work order management system 640 for the asset. Once a field action (e.g., heat test, or inspection, or maintenance) is performed, properties and inspection/maintenance information of the asset may be entered into the work order management system 640. The work order management system 640 may then send the work order information and updated measurements 645 (e.g., new measured temperature profile) of the asset to the thermal digital avatar 620 having the same identification number as the field asset. Next, the thermal digital avatar 620 may use the updated information to calculate a new temperature rating for the asset/thermal digital avatar 620.

At this stage, in some embodiments, a user may use a GUI to further modify the thermal digital avatar 620. The GUI may obtain information from the user to complete required calculations needed to determine the current temperature rating of the asset and/or to complete validation during manufacturing acceptance testing at this unique temperature rating. Furthermore, manual calculation of the thermal digital avatar 620 may be used to determine the temperature rating from the one or more failure modes (inhibited performance due to overheating and failure due to overheating) using an acceptable safety factor.

After manufacturing acceptance testing at the manufacturing location, the initial record is recorded in the thermal digital avatar 620. The asset with the same serial number as the digital avatar is then ready for use in the field. For example, the field asset may be a tool electronics assembly. During normal service levels, inspections may be performed after, during, or before an operation using the asset. The inspection results may be used as part of the calibration to determine certain time-variant thermal efficiencies of the field asset. It should be noted that some thermal efficiencies may change with time. For example, pulsed neutron generators (PNGs) may age with time and may use more power in the middle or toward to the end of lifetime compared to an initial manufacturing stage. Based on the previous job history (e.g., heat generation) of a PNG, predictions can be made based on estimation of how many more jobs can be completed with the PNG. In addition, the predictions may be used for job planning and/or ordering new PNG for replacement. Some other thermal efficiencies may not change with time. For example, a flask housing assembly may be manufactured with a certain thermal efficiency that may not change with time until becoming unserviceable (e.g., the flask housing is broken due to a mechanical deformation). The thermal digital avatar 620 may have a database that stores the initial records, initial temperature testing from the manufacturing center, and updated information as it is received from use in the field/maintenance. This ongoing modeling enables the thermal digital avatar 620 to track the asset over time to determine thermal aging rates and expected life for asset planning purposes (e.g., ordering new assets). The reduction of the operating temperature rating from the initial value recorded at the manufacturing center may be determined and used by the thermal digital avatar 620 to determine the actual temperature rating. If the thermal profile of the job is known, then the duration of the job can be determined, and quality of the measurement can be optimized by the speed of the logging or depth of penetration. This actual temperature rating may be displayed in the field asset management system 630 and be used for operational efficiency for jobs and for optimizing allocations of assets to different jobs.

In one or more embodiments, the tool assembly may house a pulsed neutron generator (PNG). PNGs contains compact linear particle accelerators that produce high-kinetic-energy neutrons by fusing isotopes of hydrogen together. The neutron generators have applications in well logging (also known as borehole logging) to make a detailed well log of the geologic formations penetrated by a borehole. A neutron porosity log is predominantly sensitive to the quantity of hydrogen atoms in a particular formation. The quantity of hydrogen atoms generally corresponds to rock porosity. In one or more embodiments, the field asset may include a PNG in a tool housing assembly. For example, the tool housing assembly may have a flask housing that contains the PNG, which generates heat loads when creating neutrons from a fusion reaction in the Minitron of the PNG. The power efficiency of the PNG may change throughout the life of the PNG as these heat loads change. The duration of the job may change over time due to different tool or borehole characteristics. For example, the borehole heat profile of the job may impact the duration of the job. The tool housing assembly may have a flask housing for a PNG cartridge that contains electronics that may also create heat loads. The power efficiency may change depending on the tool operation modes and the power becomes important when a water-flow log (WFL) is used to track a direction and velocity of water in and around the borehole. When WFL is involved, some part of electronics (e.g., shunts) heat up more than other parts during operations. Therefore, the job planning may be done to prepare for WFL using assets using their thermal digital avatars.

Using a thermal digital avatar specifically tied to a PNG in a flasked or normal housing assembly allows the field crew to complete job planning depending on the tool assembly efficiency and total power that is used to complete the job. For example, electrical efficiency of a PNG may be designated as the amount of input current and high voltage used to create a same neutron output. The electrical efficiency may be used to optimize the duration of the job or the maximum temperature at which the tool can be operated. The thermal digital avatar allows the field crew to know the customized permissible use of the PNG for a specific tool. With the current heat loads used to be able to complete the job profile known, the total duration of the job may be calculated or vice versa. In other words, using the unique digital avatar for the tool allows the tool to be run at the correct logging or drilling speed without causing overheating. Although the foregoing discusses PNG housing assemblies, similar techniques may be used in other flask housing assemblies that generate heat inside the flask housings. As an example, the flask housing assemblies are currently used to 260° C. and the internal electronics are rated to 150-175° C. In addition, even for components (e.g., flasks) with the same part/serial number, each flask may have a different thermal efficiency that indicates an amount of heat generated based on amount of power used by the flask. To deal with such scenarios, some embodiments of the thermal digital avatars may have multiple thermal digital avatars associated with a single part/serial number. As previously mentioned, the thermal digital avatar may be at least partially based on manufacturing data. For example, the thermal digital avatar may obtain heat test data from a supplier/manufacturer as part of the initial record and utilize these initial tests to the unique flask's maximum capacity. Subsequent heat tests (e.g., water tank tests) may be performed to determine heat generation changes to heat generation over time. The subsequent heat tests may be performed periodically and/or before/after each use. In certain embodiments, a maintenance step of measuring resistance or impedance may enable the user to avoid repeating a heat test.

As discussed in the preceding sections, once a unique thermal digital avatar is created, it will be linked with a field asset in one or more operational systems by associating an identification number of the asset with the thermal digital avatar. These operational systems may include the manufacturing management systems 610 for manufacturing assets at the technology center, asset management systems for field assets, work order management systems for maintenance, and the cloud digital technologies in the data lake to track power inputs of the tool to create needed outputs (e.g., the input current and high voltage to create neutron output for PNGs). Thermal digital avatar may connect to the operational systems via a common platform to complete the calibration of the tool in the lab and may be updated with heat generation as the tool assembly is used in the field.

Additional measurements may be made after the asset associated with the thermal digital avatar is used. For example, an estimated life of the asset (e.g., PNG) by tracking the heat generation versus neutron output. The heat generation may be lower at early life with longer duration jobs than at the end of life of the asset. The thermal digital avatar may give field and technology center engineers the ability to track and make predictions on asset-specific replacement or repair.

In other examples, the electrical resistors or transformers of the asset create heat when being used for downhole tools and different operations of the tools may have different heat loads. In addition, different tools even of the same part number may have different efficiencies and performance. The individual tool tracking capability enabled by the thermal digital avatars enables better job planning of downhole tools. The heat generation may be restricted to the specific tool due to the temperature rating of that tool or the duration of the job. Thus, the thermal digital avatar may be used to optimize the tool performance during an expected job profile at the operational planning stage. Additionally, or alternatively, the thermal digital avatars may also enable more informed decisions in choosing the right tool that has sufficient thermal efficiency for the upcoming job. For example, locations with harsh job may be assigned the most efficient tool (thermal efficiency), and locations with lower temperature or shorter duration to have less thermally efficient tools in a descending order.

Figure 7:
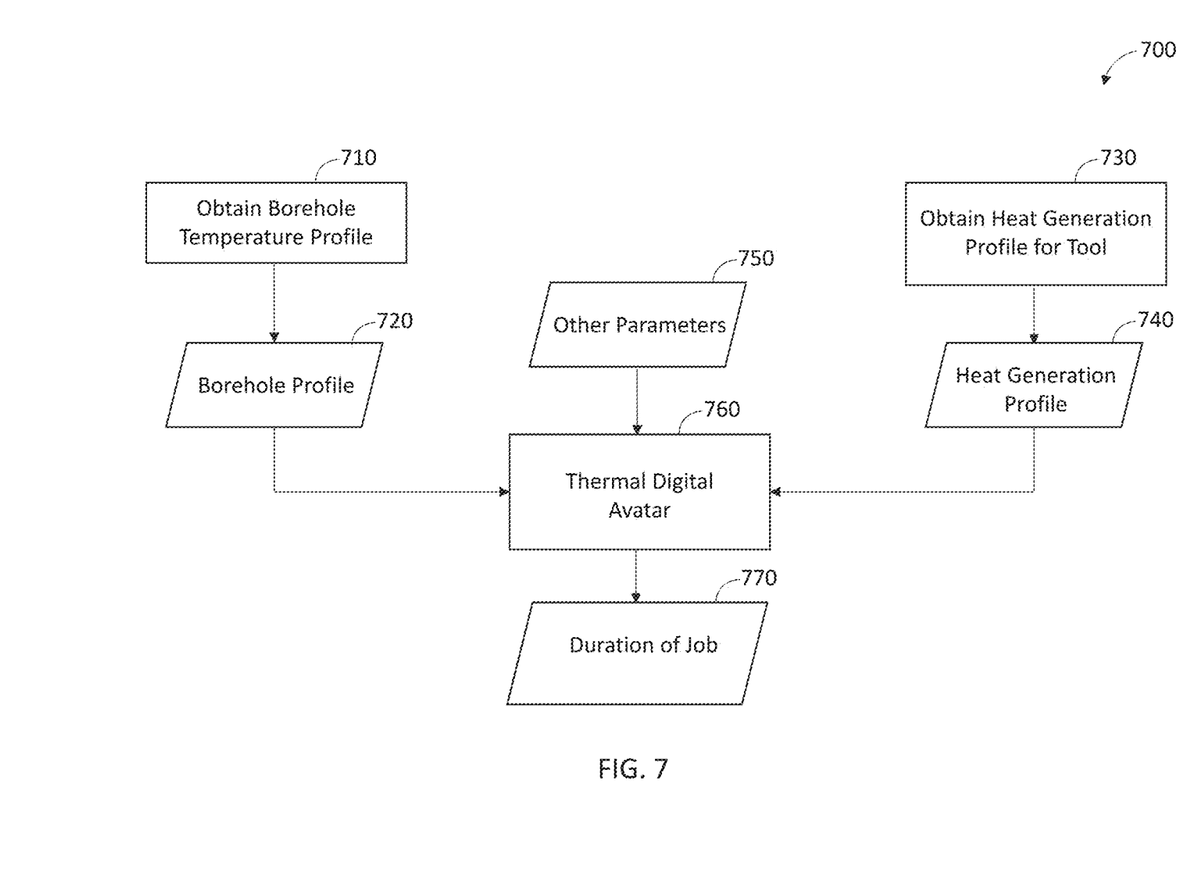
FIG. 7 depicts a flow diagram for using an example thermal digital avatar with the asset management system of FIG. 5, in accordance with an embodiment.

FIG. 7 depicts a process 700 flow of steps employed in accordance with one example thermal digital avatar implementation. The borehole temperature profile 720 (e.g., the temperature variation with time/depth) for a borehole in a given mud system is acquired (block 710). The borehole temperature profile 720 is then input into the thermal digital avatar 760. The heat generation profile 740 of a tool assembly (such as the PNG assembly) deployed or to be deployed in the borehole is also acquired (block 730). The heat generation profile 740 is then input into the thermal digital avatar 760. For example, this heat generation profile 740 may be input to the thermal digital avatar 760 during manufacture, during operation of the asset, obtained from one or more services, or a combination thereof. The heat generation profile 740 may be used to determine how much heat is generated to perform the job. For example, the heat generation profile 740 may indicate how much heat will be generated using an amount of power to perform porosity logging of a particular distance/resolution from the borehole. In addition, other operating parameters 750 (e.g., power generation, resistance, impedance, thermal efficiency, mud type, formation type, etc.) may also be input into the thermal digital avatar 760.

The thermal digital avatar 760, via at least one processor, may be configured to automatically run the automatic model (s) with the new information and provides new output (e.g., a new operating parameter). The output may indicate the maximum duration 770 of the job based at least in part on the borehole temperature profile 720 and the heat generation profile 740. Such modeled output may allow the tool assembly to complete longer duration jobs in the field operations, therefore the field crew may complete more jobs that they might not have been able to.

Figure 8:
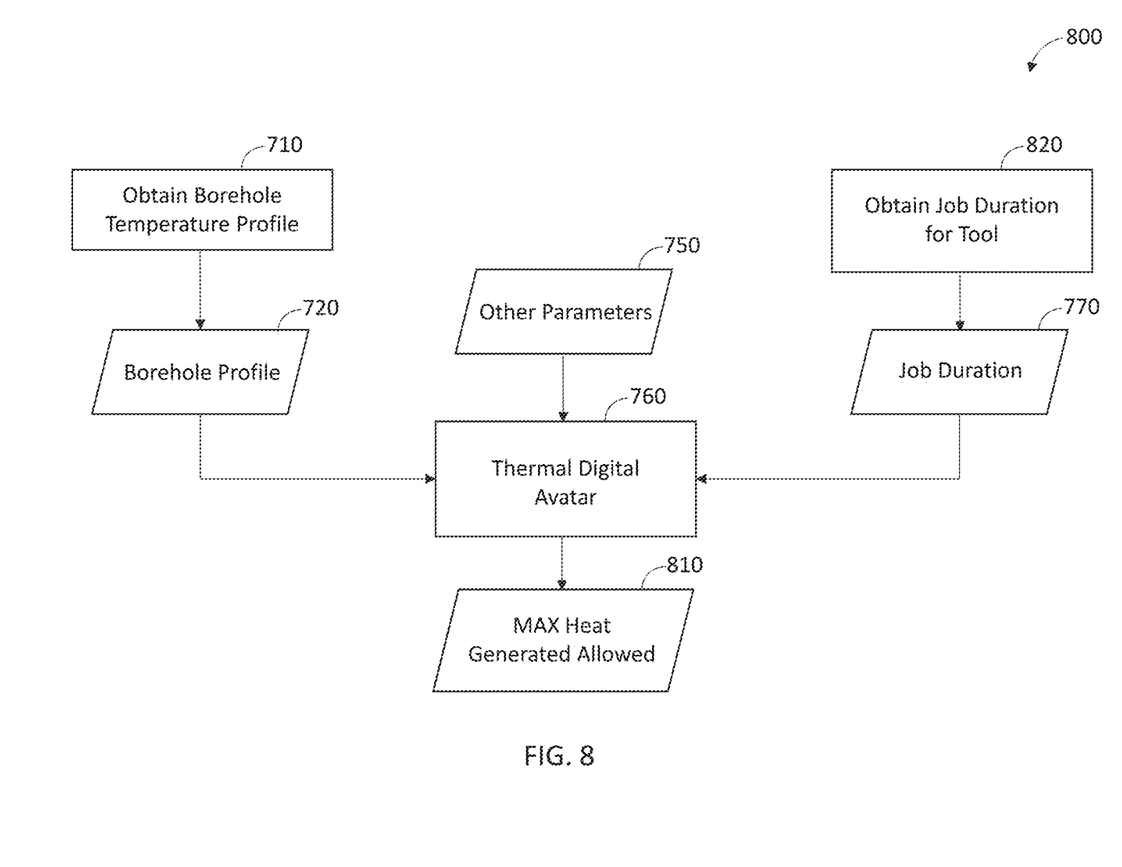
FIG. 8 depicts a flow diagram of another example thermal digital avatar with the asset management system of FIG. 5, in accordance with an embodiment.

Similar to the implementation illustrated in FIG. 7, FIG. 8 illustrates a process 800 using the thermal digital avatar. However, in the process 800, the thermal digital avatar 760 utilizes the borehole profile temperature 720 for a borehole in a given mud system to determine a maximum heat generation allowed 810. One or more processors obtain the maximum duration 770 for the job (block 820). As a result, the output from the thermal digital avatar 760 modeling may be used to indicate the maximum heat generation allowed 810 during the job. In other words, the tool may run at a power level below a maximum power but above a threshold necessary to complete the job. Such modeled output may allow for increasing the heat generation allowed for the tool to a level customized for the specific tool to be used. Such customization enables the field crew to complete more jobs or obtain better data quality during the same job parameters because of the higher power (heat) allowed for the specific tool. The thermal digital avatar 760 described herein uses the power level of the tool, the permissible duration for the job, and the borehole temperature profile to keep heat experienced by the particular tool below inhibited function.

In one or more embodiments, the maximum heat generation allowed 810 may be used by an asset management system to assign a downhole tool to a location, which comprises a particular region among a group of regions. For example, tools with the same part number are to be used for field operations (jobs) in different geographical regions. With the individual tool tracking capability enabled by the thermal digital avatars, tools with higher maximum heat generation allowed may be assigned to the regions where higher temperature field operations are anticipated, and tools with lower maximum heat generation allowed may be assigned to the other regions where lower temperature field operations are anticipated.

In one or more embodiments, direct electrical measurement of the tool assembly may be used in addition to the tool properties. These direct measurements may be used to update an automatic (e.g., FEA/CFD) model setup with normal engineering failure modes known for that assets from life testing or field testing due to overheating. The temperature versus life relationship may be determined with well-controlled lab tests (e.g., water tank tests). As may be appreciated, the tool life decreases with the increase of temperature. The automatic modeling may be completed at the time of manufacturing acceptance testing as this is the first time the tool is run, but testing can be performed in the field as well. At the technology center or in the field, the thermal digital avatar with a GUI may be used to complete the multiple automatic calculations (e.g., FEA/CFD) used to be able to determine the duration of the job or the maximum heat generation allowed.

The additional benefits of the thermal digital avatar are the ability of the FEA or CFD geometry to be unique per asset serial number if the manufacturing process had a non-conformance and the engineer determines that this is a useful asset for the majority of the thermal or pressure rating needed for operation in the field despite the nonconformance. The tracked geometry (e.g., geometry of a heatsink) may impact heat dissipation/generation for the asset. The thermal digital avatar may have the capability to track one or more morphology/geometry options for a given design. Each serial number may have a single morphology. To be clear, the morphology uses a discrete selection driving the available parameters that may be filled out for an assembly. This morphology may be identified with a tag (e.g., ZZ), while a standard morphology may be identified with a different tag (e.g., STANDARD). When selecting the non-conformant morphology, the parameters for a geometry may be available to the user when the selection of the standard morphology is selected. As new morphologies are encountered (e.g., extra cut, missing feature, material selection/type, patches/repairs, etc.), the new morphologies may be added to the list of available morphologies for a given serial number of tool assembly.

It should be noted that the usage of digital avatar and the corresponding benefits may differ depending on the levels at which the digital avatar is utilized. For example, at the tool manufacturing level, the digital avatar may be used in the manufacturing process to determine the initial thermal rating and salvage nonconforming devices for lighter deployments.

At a well site or a maintenance system level, the thermal digital avatar may optimize the tool performance before the job is initiated. In some embodiments, the avatar may use parameters of thermal profile, heat generation of the electronics assembly, and PNG flask housing S/N containing thermal efficiency as inputs to the model of the thermal digital avatar to generate the output that may be maximum duration of the job. As an example, by knowing the output of the PNG that matches the minimum neutron output required for the job, the heat generation associated with such PNG output may be inputted into the thermal digital avatar with the temperature profile to give an output of the duration of the job, or allow for picking the correct flask S/N for the given job profile and heat generation. In certain embodiments, the thermal digital avatar may use the parameters of thermal profile (e.g., the temperature variation with time) and duration of the job as inputs to the FEA or CFD model and generate the output that may be the maximum heat generation permissible by the asset during an identified job. As an example, by knowing the temperature profile and duration of the job, the thermal digital avatar may determine the maximum heat generation with which a suggested neutron output may be used to increase data quality or increase logging speed.

Further, at a maintenance level, the thermal digital avatar may include a database that may enable it to know the initial records and potentially enable the asset to be tracked with time to determine expected life for asset planning purposes (e.g., ordering new assets/scheduling maintenance actions).

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method implemented by at least one data processor having processor-implemented instructions, the method comprising:
   obtaining a borehole temperature profile for a borehole in a given mud system;
   obtaining a tool-specific heat generation profile for a particular downhole tool, wherein the tool-specific heat generation profile characterizes amount of heat generated by the particular downhole tool;
   inputting both the borehole temperature profile and the tool-specific heat generation profile to a thermal digital avatar for the particular downhole tool, wherein the thermal digital avatar is configured to track a thermal profile for the particular downhole tool and calculate a maximum duration for a job in the borehole for the particular downhole tool;
   outputting the maximum duration for the job as calculated by the thermal digital avatar; and
   performing field operations by the particular downhole tool based on the maximum duration for the job as calculated by the thermal digital avatar.

2. The method of claim 1, wherein the thermal digital avatar is at least partially stored in a cloud.

3. The method of claim 1, wherein the thermal profile for the particular downhole tool indicates under how much heat the particular tool may undergo before function is inhibited.

4. The method of claim 3, wherein the tool-specific heat generation profile indicates an amount of heat generated for a power level to be used for the job.

5. The method of claim 4, wherein the thermal digital avatar uses the power level to be used for the job, the maximum duration for the job, and the borehole temperature profile to keep heat experienced by the particular downhole tool below the level that inhibits function.

6. The method of claim 1, wherein the thermal digital avatar comprises parameters that affect thermal operations of the particular downhole tool.

7. The method of claim 1, wherein the tool-specific heat generation profile comprises a thermal efficiency for the particular downhole tool that indicates an amount of heat generated based on amount of power used by the particular downhole tool.

8. The method of claim 7, wherein the thermal efficiency for the particular downhole tool is based at least in part on the age of the particular downhole tool.

9. The method of claim 7, wherein the thermal efficiency for the particular downhole tool is based at least in part on an imperfection of a heatsink of the particular downhole tool.

10. The method of claim 1, wherein the tool-specific heat generation profile for the particular downhole tool is different than an additional tool-specific heat generation profile for another downhole tool having a same part number.

11. The method of claim 1, wherein the borehole temperature profile comprises a profile of temperature variations over time or depth of the borehole in the given mud system.

12. The method of claim 1, wherein:
the maximum duration for the job is calculated using a customized model for the particular downhole tool in the digital thermal avatar to predict the maximum duration for the job.

13. A method implemented by at least one data processor having processor-implemented instructions, the method comprising:
storing a thermal digital avatar for a particular downhole tool, wherein the thermal digital avatar comprises a customized model for the particular downhole tool that models specific parameters of the particular downhole tool;
obtaining, at the thermal digital avatar, a borehole temperature profile for a borehole in a given mud system;
obtaining, at the thermal digital avatar, a job duration for a job;
calculating, using the thermal digital avatar, a maximum heat generation allowed for the particular downhole tool based at least in part on the borehole temperature profile; and
outputting the maximum heat generation allowed for the particular downhole tool as calculated by the thermal digital avatar; and
controlling operating parameters of the particular downhole tool in performing the job based on the maximum heat generation allowed for the particular downhole tool as calculated by the thermal digital avatar.

14. The method of claim 13, wherein the particular downhole tool and an additional downhole tool have a same part number while having different tool-specific heat generation profiles in different thermal digital avatars.

15. The method of claim 13, wherein the instructions are configured to cause the thermal digital avatar to obtain additional parameters of the particular downhole tool, wherein calculating the maximum heat generation allowed for the particular downhole tool is based at least in part on the additional parameters.

16. The method of claim 13, wherein the instructions are configured to cause the one or more processors to assign the particular downhole tool to a location based at least in part on the maximum heat generation allowed for the particular downhole tool.

17. The method of claim 16, wherein the location comprises a region with field operations at temperatures that correspond to the maximum heat generation allowed for the particular downhole tool.

18. A system, comprising:
a particular downhole tool;
one or more processors; and
memory storing instructions that, when executed by the one or more processors, are configured to cause the one or more processors to:
receive a tool-specific initial thermal profile for the particular downhole tool;
store the tool-specific initial thermal profile in a thermal digital avatar for the particular downhole tool;
receive an update to a physical characteristic of a thermal profile for the particular downhole tool where the physical characteristic affects the thermal profile for the particular downhole tool;
update the thermal profile for the particular downhole tool based on the update to the physical characteristic; and
assign the particular downhole tool to a job involving field operations based at least in part on updated thermal profile.

19. The system of claim 18, wherein the physical characteristic comprises an imperfection in a heatsink of the particular downhole tool, the age of the particular downhole tool, results of a heat generation test, or a combination thereof.

* * * * *